United States Patent [19]

Richmond et al.

[11] 4,250,458
[45] Feb. 10, 1981

[54] BASEBAND DC OFFSET DETECTOR AND CONTROL CIRCUIT FOR DC COUPLED DIGITAL DEMODULATOR

[75] Inventors: Robert L. Richmond, Frederick; Paul F. Wyar, Mt. Airy, both of Md.

[73] Assignee: Digital Communications Corporation, Gaithersburg, Md.

[21] Appl. No.: 44,143

[22] Filed: May 31, 1979

[51] Int. Cl.³ .................... H03D 3/00; H04L 27/22
[52] U.S. Cl. .................... 329/112; 329/133; 375/76; 375/99
[58] Field of Search .............. 329/110, 112, 131, 132, 329/133; 375/76, 83, 84, 99

[56] References Cited

U.S. PATENT DOCUMENTS

| 3,205,442 | 9/1965 | Stamboulis | 329/133 X |
| 3,688,205 | 8/1972 | Burger | 329/132 |

Primary Examiner—Siegfried H. Grimm
Attorney, Agent, or Firm—Pollock, Vande Sande & Priddy

[57] ABSTRACT

The digital demodulator produces an information bearing analog signal which is controlled in peak-to-peak amplitude. The signal is coupled to a soft-decision demodulator which provides a multi-bit output representative of magnitude (polarity and amplitude) of the analog signal at a rate determined by the symbol clock derived from the digital demodulator. Logic means produces a logic signal of a first or second type in response to selected multi-bit outputs of the soft-decision demodulator. A logic output of the first type is produced if either the multi-bit output represents an analog signal of one polarity and amplitude greater than a predetermined amplitude, or if the multi-bit output represents an analog signal of the other polarity and amplitude less than an equal predetermined amplitude of the other polarity. The logic output is coupled to an integrating means which produces a control signal representative of deviations of the logic signal of the first type from 50% duty cycle. The deviation from 50% duty cycle determines the amplitude of the DC offset, and the polarity of the deviation determines the polarity of the offset. The output of the detector can be used in a feedback loop to eliminate the DC offset by coupling the control signal to a summing junction, to which is also coupled the analog signal.

6 Claims, 4 Drawing Figures

4,250,458

BASEBAND DC OFFSET DETECTOR AND CONTROL CIRCUIT FOR DC COUPLED DIGITAL DEMODULATOR

FIELD OF THE INVENTION

The present invention relates to an improvement in digital demodulators, which improvement is more specifically a DC offset detector and a DC offset correction circuit for use in minimizing DC offset in a DC coupled digital demodulator.

BACKGROUND OF THE INVENTION

Traditionally, communication of digital intelligence requires that a bit stream, representing the intelligence to be transmitted, be employed as a modulating signal to modulate a carrier, thus producing an analog waveform carrying the same intelligence. After transmission, a digital demodulator recovers the digital intelligence by processing the received signal. Typically, the digital demodulator produces an analog signal which carries the intelligence that has been transmitted, and further demodulation recovers the intelligence.

One of the corrupting influences present in the analog signal is DC offset; efficient and effective demodulation requires the reduction of this DC offset. DC offset is introduced at many points in the communication channel, typically, such offset is produced in a mixer included in the demodulator. One well-known technique for eliminating DC offset is by employing a capacitor in the signal path, which capacitor is effective to block DC levels. This technique, referred to as AC coupling, cannot be employed where the demodulator is intended to be pattern insensitive. Regardless of the particular type of modulation employed, pattern insensitivity requires that the digital demodulator respond correctly to a repeating sequence of binary signals of one type or the other. Such a repeating sequence is manifested, in the demodulator, as a DC level, and AC coupling the analog signal will erroneously remove this DC level.

Digital demodulators typically include either hard-decision demodulation or soft-decision demodulation. In hard-decision demodulation, information is extracted from the analog signal by noting the polarity at specified points in time. Soft-decision demodulation decodes or converts the analog signal into a multi-bit digital output which is representative, not only of the polarity (which is the sole bit of information employed in hard-decision demodulation) but the amplitude as well. Those skilled in the art will understand that soft-decision demodulation is more capable than hard-decision demodulation, but carries a requirement of greater circuit complexity.

SUMMARY OF THE INVENTION

The present invention is implemented by employing the multi-bit outputs of the soft-decision demodulator. If the digital demodulator already includes a soft-decision demodulator, the output already present in the demodulator can be employed. If the demodulator does not include a soft-decision demodulator, then the DC offset detector and correction circuit of the invention includes its own soft-decision circuit. In any event, the soft-decision signal, comprising a multi-bit digital signal, is coupled to an offset detector. One of the requirements for proper operation of the offset detector is controlled peak-to-peak amplitude for the analog signal, and such control is achieved in conventional fashion by employing a well-known AGC circuit. One AGC circuit which can be employed in using the present invention employs the soft-decision outputs as an input to an AGC detector for providing a control signal to the AGC circuit.

The DC offset detector includes a logic circuit which responds to the multi-bit soft-decision output. The logic circuit produces either a logic signal of a first or second type. The first logic signal is produced under one of two different conditions, either the analog signal is of one polarity greater than a predetermined amplitude, or the analog signal is of the other polarity less than an equal predetermined amplitude of the other polarity. Lack of DC offset is represented by a first logic signal which has an average 50% duty cycle, that is, the first logic signal is present on 50% of the time. An integrating means is provided which responds to the logic output and produces a control signal which is representative of the deviation of the logic output from 50% duty cycle. The polarity of the deviation from 50% duty cycle indicates the polarity of any DC offset, and the amplitude of the deviation of the logic output from 50% duty cycle is reflected in the amplitude of the control signal.

A DC offset correction circuit includes the DC offset detector, as well as a summing junction to which two signals are applied, namely, the analog signal whose DC offset is to be corrected, and a scaled representation of the control signal. The output of the summing junction is a modified analog signal which has been corrected for DC offset.

As those skilled in the art will readily perceive, the present invention is applicable to digital demodulators which are to be pattern insensitive regardless of the particular modulation technique employed. When quadrature modulation techniques are employed, i.e., for example, QPSK, a DC offset detector or a DC offset correction circuit in accordance with the present invention is provided for each of the in-phase and quadrature channels.

In view of the foregoing, it will be perceived that the present invention comprises a DC offset detector or correction circuit for a DC coupled digital demodulator which generates an information bearing analog signal of controlled peak-to-peak amplitude and a symbol clock, in which the offset detector or correction circuit includes:

soft-decision circuit means responsive to said analog signal and to said symbol clock for providing a repetitive multi-bit output each such multi-bit output representing polarity and amplitude of said analog signal at different points in time, logic means responsive to said multi-bit output for producing a first logic signal if said multi-bit output represents either an analog signal of one polarity, greater in amplitude than a predetermined amplitude, or an analog signal of the other polarity and amplitude less than an equal predetermined amplitude of said other polarity, and integrating means responsive to said logic output for producing a control signal representative of deviations of said first logic signal from 50% duty cycle.

The correction circuit of the present invention includes the detector as described above and further includes a summing junction to which is applied a scaled replica of the control signal as well as the analog signal. The summing junction need not include amplification, although the use of amplification at the summing junction is within the scope of the invention.

In order to enable those skilled in the art to readily practice the invention, preferred embodiments of the invention will now be described in the remaining portion of the specification when taken in conjunction with the attached drawings.

BRIEF DESCRIPTION OF THE DRAWINGS

In the attached drawings, identical reference characters have been employed to identify identical apparatus and furthermore.

DETAILED DESCRIPTION OF A PREFERRED EMBODIMENT

Figure 1:
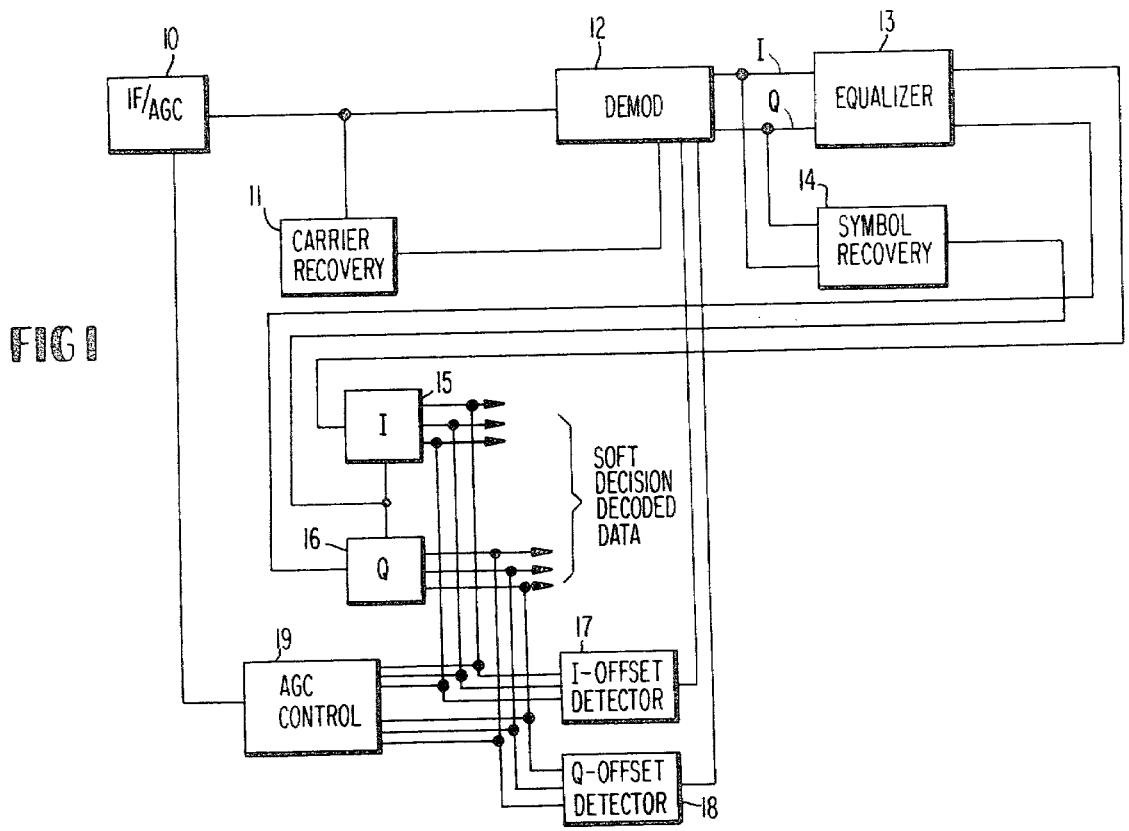
FIG. 1 is a block diagram of portions of a conventional digital demodulator to which has been added the DC offset correction circuit of the present invention.

FIG. 1 illustrates portions of a typical DC-coupled digital demodulator, to which has been added the DC offset correction circuit of the present invention. More particularly, the digital demodulator includes an IF-/AGC circuit 10. The output of the IF/AGC circuit is coupled to a carrier recovery circuit 11 and a demodulator stage 12. The demodulator represented in FIG. 1 is arranged to operate with QPSK signals and therefore, the output of the demodulation stage 12 comprises baseband signals in two channels. Although this embodiment has two channels, the invention can be used for any number of binary channels. These signals are coupled in parallel to a digital equalizer 13 and a symbol recovery circuit 14. Equalizer 13 is conventional in the art and is employed for reducing inter-symbol interference. The equalizer output again comprises baseband signals in two channels and these are coupled, as illustrated in FIG. 1, to soft-decision circuits 15 and 16. The symbol clock, which is the output of the symbol recovery circuit 14 (which is also conventional in the art) is coupled as a clocking signal to the soft-decision circuits 15 and 16.

At this point, those skilled in the art should be aware that the present invention is not limited to use with digital demodulators employing soft-decision demodulation. A digital demodulator employing hard-decision demodulation employs the outputs of the equalizer 14 and the symbol recovery circuit 14 for further demodulation. In those instances, the DC offset detector and correction circuit of the present invention includes the soft-decision circuits 15 and 16. Otherwise, where the digital demodulator employs soft-decision circuits, the outputs from the existing soft-decision circuits can be employed in the DC offset detector and correction circuit of the present invention.

In any event, the outputs of each of the soft-decision circuits comprises a multi-bit output representative of the polarity and amplitude of the analog signal present at its input. The soft-decision circuits 15 and 16 illustrated in FIG. 1 provide a three-bit output, although those skilled in the art will perceive that the bit length of the soft-decision demodulator output can be varied depending upon the results sought to be achieved.

The multi-bit outputs of the soft-decision demodulators 15 and 16 are coupled to DC offset detectors 17 and 18 for the I and Q channels, respectively. The outputs of each of the detectors 17 and 18 comprise I and Q control signals representative of polarity and amplitude of any DC offset. These control signals, after suitable scale changing, if necessary, are coupled back to the first stage demodulation circuit 12 for summing with the analog signal developed for the I and Q channels, respectively. In this fashion, the DC offset detected by the circuit 17 and 18 can be cancelled in the I and Q channels.

An embodiment of the present invention which has been constructed is described in "An Optimum Multi-Rate QPSK Modem" appearing in the *Conference Record, International Conference on Communications ICC'78*, Vol. II, Session 25.5.1. As will become apparent, the DC offset detector and correction circuit of the invention rely upon the controlled peak-to-peak nature of the amplitude of the analog signal. Such control is readily achieved, using conventional techniques including AGC. A control voltage for an AGC circuit can be developed from the soft-decision circuit outputs of the decoders 15 and 16, as is represented in FIG. 1 by the AGC control circuit 19.

Figure 2:
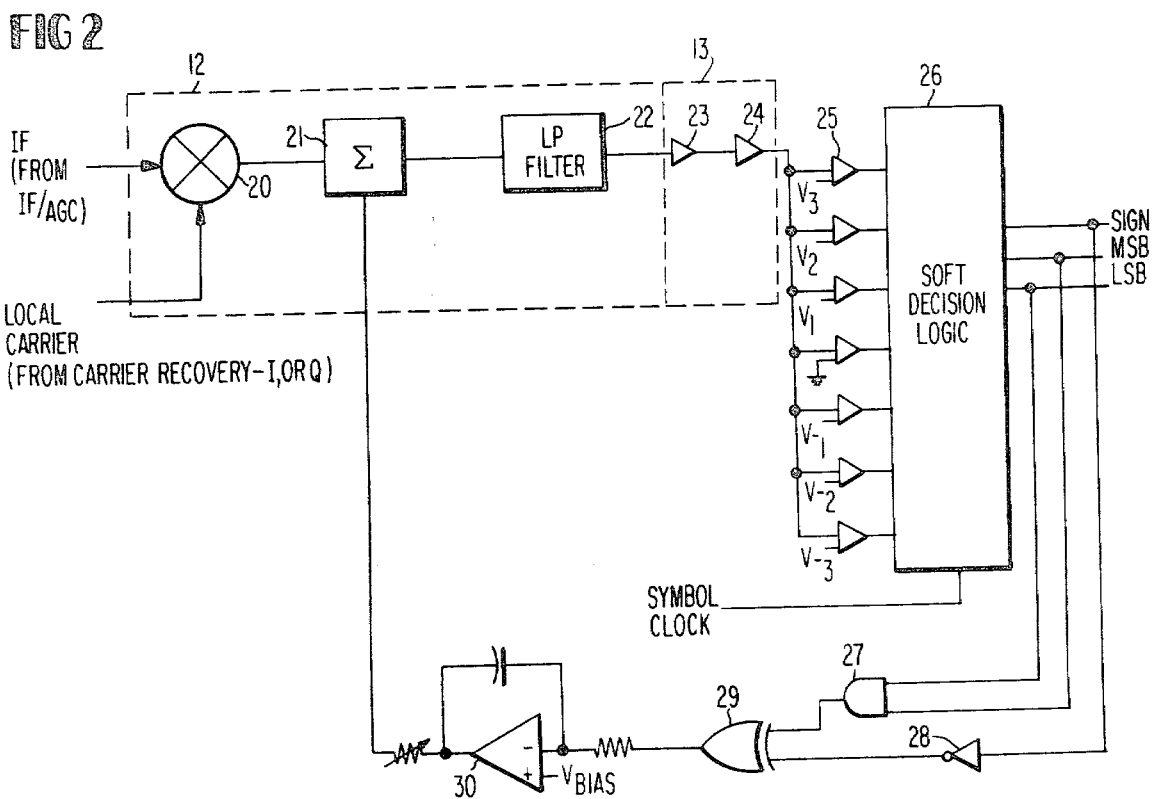
FIG. 2 is a block diagram illustrating application of the DC offset correction circuit to a typical channel in a digital demodulator.

FIG. 2 is a block diagram illustrating the principles of the present invention in connection with a QPSK demodulator. It should be understood that the illustration in connection with a QPSK demodulator is only exemplary; the invention is capable of detecting offset in almost any type of binary channel.

As shown in FIG. 2, the demodulation stage 12 includes a balanced mixer or modulator 20, receiving on one input an IF signal, and on another input, a local carrier. In a QPSK demodulator, the demodulation stage employs a mixer or balanced modulator 20 for each of the two channels, each fed in common with the IF signal, but fed phase-shifted representations of the local carrier for developing the I and Q baseband signals which are the output of the mixer 20. Thus, FIG. 2 illustrates one of the two channels in a QPSK demodulator. The baseband signal is coupled to a summing junction 21, which, as previously indicated, may or may not include amplification. The output of the summing junction 21 is low pass filtered by filter 22. DC coupled amplifiers 23 and 24 represent signal processing circuits in the equalizer. Those skilled in the art will understand that the equalizer 13 includes components other than the amplifiers shown; these components are conventional and not necessary to an understanding of the present invention. However, the showing in FIG. 2 is significant in that the amplifiers are DC-coupled. The output of the amplifier 24 is coupled to the soft-decision circuit including a plurality of comparators 25, each receiving as one input the output of the amplifier 24. The other input to each of the comparators 25 is a reference signal, which is different for each of the comparators 25, such reference signals denoted at $V_3$ through $V_{-3}$. The output of each of the comparators 25 is coupled to a soft-decision logic circuit 26, itself conventional in the art and therefore not illustrated. Each of the comparators produces a distinctive signal whenever its input exceeds the reference. The logic circuit 26 combines the comparator outputs and produces a multi-bit output which is representative of the amplitude and polarity of the analog signal appearing at the input to each of the comparators 25. Since the signal chain from the output of the modulator 20 to the input to the comparators is DC-coupled, the analog signal at the input to the comparators will reflect the DC offset produced at the output of the modulator 20. Before further describing the circuit of FIG. 2, reference is made to FIG. 4 to briefly illustrate the operation of the soft-decision demodulator including the comparators 25 and the logic 26.

Figure 4:
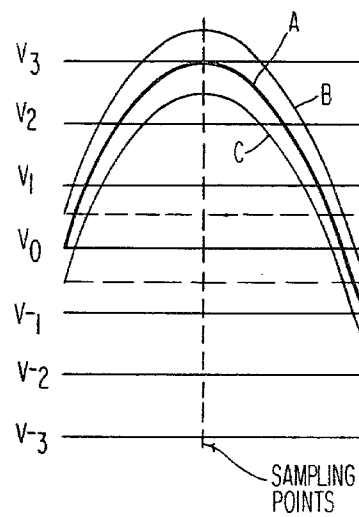
FIG. 4 illustrates three typical analog signals, as appearing in a typical DC-coupled digital demodulator as well as representative outputs of a three-bit soft-decision demodulator, representing polarity and amplitude of the analog signal.

As shown in FIG. 4, the magnitude range for the analog signal is divided into 8 bands, i.e., greater than $V_3$ between $V_3$ and $V_2$, etc. An analog signal magnitude in each one of these bands corresponds to a soft-decision demodulator output shown at the right. Accordingly, there are 8 different possible output combinations, each representative of an analog signal magnitude. Since the analog signal is continuously changing, as a function of time, the soft-decision logic is clocked by the symbol clock produced by the symbol recovery circuit 14 (FIG. 1). Accordingly, the multi-bit output of the soft-decision logic circuit 26 represents the magnitude of the analog signal at the time of the symbol clock (referenced as sampling points in FIG. 4) and this bit combination is maintained until the occurrence of the next symbol clock.

Returning now to FIG. 2, the multi-bit output of the soft-decision demodulator is coupled to an AND gate 27 (MSB and LSB) and the output SIGN is coupled, through an inverter 28, to one input of an exclusive OR gate 29, the other input of which is provided by the output of the AND gate 27.

Assuming positive logic is employed (i.e., a high voltage level represents binary "1" and the low voltage level represents binary "0"), the output of the AND gate 27 will be high when MSB and LSB is high (a logic output of the first type). Reference to FIG. 4 indicates that this condition exists only when the absolute value of the analog signal exceeds $V_3$ or $V_{-3}$. As will become apparent as this description proceeds, the levels of the various reference voltages are selected to be symmetrical about the axis and thus, the absolute value of $V_3$ and $V_{-3}$ are equal.

In any event, the output of the AND gate is provided as one input to the exclusive OR gate 29. The other input to the exclusive OR gate 29 is $\overline{SIGN}$. Accordingly, the output of the exclusive OR gate will provide a high output under either of two circumstances (a logic signal of the first type); firstly, if SIGN is "1" (representing a positive polarity of the analog signal) and the amplitude of the analog signal exceeds $V_3$, or, if SIGN is "0" (representing a magnitude less than $V_{-3}$). Under all other circumstances, the output of the gate 29 will be low. Although the preceding discussion has been in terms of positive logic, those skilled in the art will perceive that negative logic could also be employed.

Referring now to FIG. 4, and recalling that the peak-to-peak amplitude of the analog signal has been controlled to twice $V_3$, the following possibilities are present. Because of the real world corruption of the analog signal by noise, its positive peak and negative peak will actually vary around $V_{-3}$ and $V_3$. Because the noise is assumed Gaussian, the probability of the absolute value of the magnitude exceeding $V_3$ is exactly one-half. Under these circumstances, the output of the gate 29 will have a probability of one-half for either a low or high output. If, however, there is some positive DC offset, then the peaks of the analog signal will respectively exceed $V_3$ and be less than (in absolute value) $V_{-3}$. Under these circumstances, the probability of the gate 29 being high would be greater than the probability of its output being low. Similar considerations apply to a negative DC offset. Accordingly, the duty cycle of the output of the gate 29 directly reflects any DC offset, i.e., a duty cycle for positive logic in excess of 50% represents positive DC offset, and likewise, a duty cycle less than 50% represents negative DC offset. For a limited range in DC offset, the magnitude of the deviation of the duty cycle of the output of the gate 29 represents the magnitude of the DC offset. It is therefore the function of the remaining circuitry to produce a control signal representative of the duty cycle of the output of gate 29. As shown in FIG. 2, the output of the gate 29 is coupled through a resistor to the negative input of an operational amplifier 30 which is configured as an integrating inverting operational amplifier by the feedback capacitor. The positive input to the operational amplifier 30 is provided by a reference signal $V_{bias}$. Depending on the time constant of the integration (determined by the magnitude of the resistance and capacitance of the resistor and capacitor) the magnitude of the output of amplifier 30 represents deviation from 50% duty cycle of the output of gate 29 and the polarity represents the polarity of the deviation. That is, more particularly, the output of the integrator goes positive for negative DC offset and alternatively goes negative for positive DC offset. The output of the amplifier 30 is a negative feedback signal which is first scaled by the potentiometer, and coupled to summing junction 21 to cancel the DC offset.

As a result of DC offset cancellation, the comparator reference signals are maintained precisely with respect to the input voltage. In an embodiment of the invention which has been constructed, DC offset is limited to less than 1% of the total peak-to-peak voltage waveform.

This operation can easily be explained in connection with FIG. 4 which illustrates three curves, a curve A which has no DC offset, a curve C with negative DC offset, and a curve B with positive DC offset. Referring first to curve B, it will be noted that at the two sampling points shown in the waveform, the soft-decision logic produces the bit combination 111 and then 010. The first bit combination will produce a high output of the gate 29, and the second bit combination will also produce a high output of the gate 29. Thus, the duty cycle will be significantly in excess of 50%. For curve C, with a negative DC offset, the bit combinations produced by the soft-decision logic are 110 and 011. The first bit combination input to the logic elements 27–29 will produce a low output of the gate 29, and the second bit combination will also produce a low output of the gate 29, and thus, the duty cycle at the output of gate 29 will be significantly below 50%.

The other input to operational amplifier 30 ($V_{bias}$) and the setting of the potentiometer, coupled to the output of the amplifier, are selected so that with a 50% duty cycle output of gate 29, the summing junction 21 produces no change to the analog signal. Changes in the duty cycle change the output of the amplifier 30 with a polarity opposite to that of the change in the duty cycle, i.e., for an increase in the duty cycle the change in the output of amplifier 30 is negative, and for a decrease in the duty cycle, the change in the output of the amplifier is positive. Furthermore, the amplitude of the change of the output is directly related to the change in duty cycle.

Figure 3:
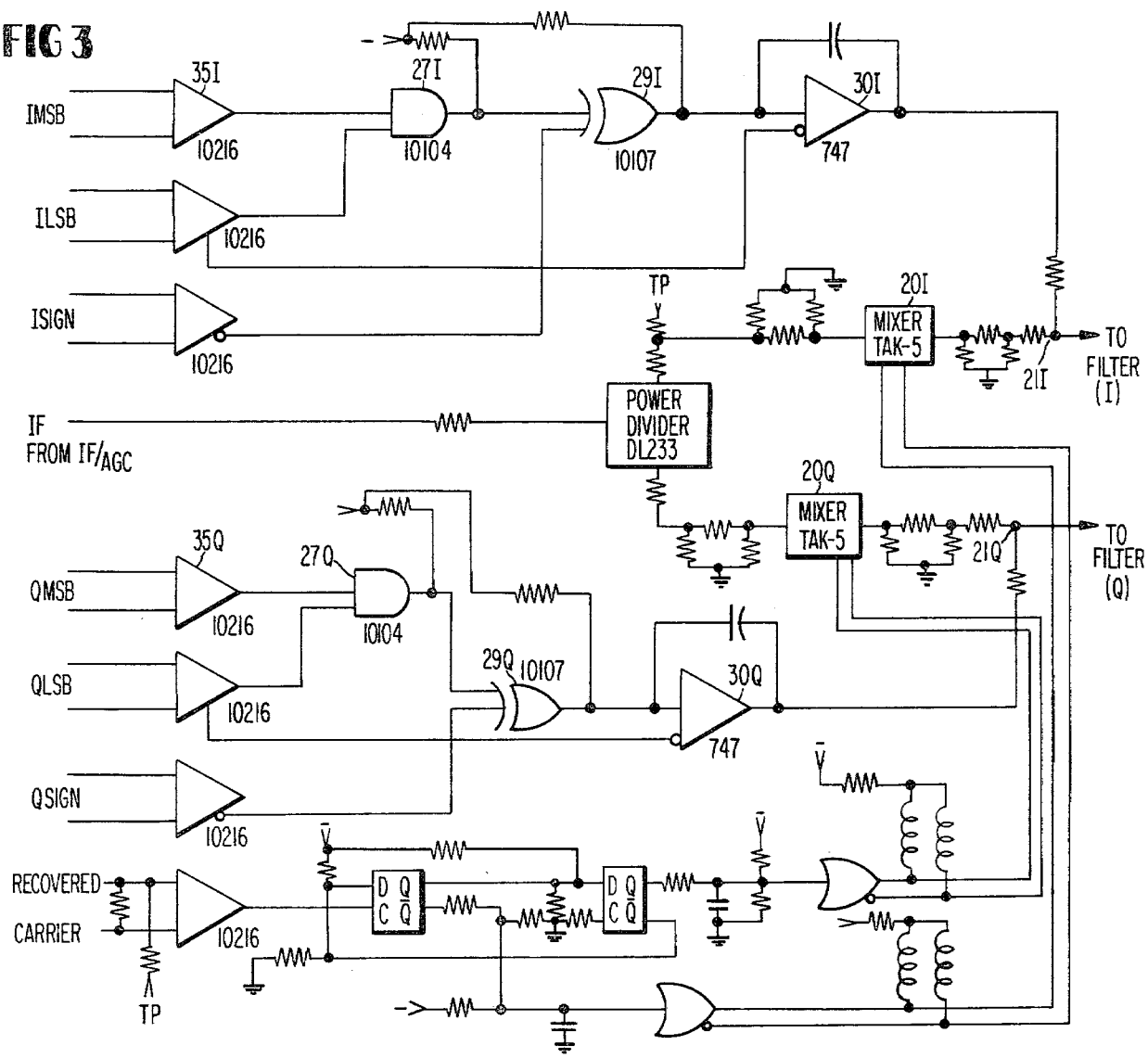
FIG. 3 is a schematic illustrating application of the DC offset correction circuit to a preferred embodiment of a digital demodulator.

FIG. 3 is a schematic of the preferred embodiment of the invention for both the I and Q channels. The upper portion of FIG. 3 shows a plurality of amplifiers 35 coupled to the outputs of the soft-decision logic circuit 26. The reference characters correspond to the reference characters of FIG. 2 with a suffix indicating I or Q channel apparatus. As is apparent from FIG. 3, the effect of the inverter 28 is achieved by using an inverting output of the amplifier 35. The summing junction in the preferred embodiment does not employ amplification. The circuitry in the middle of FIG. 3 is the Q channel logic corresponding to gates 27-29, and the lower portion of FIG. 3 illustrates production of the local carrier for both I and Q channels.

The preferred embodiment illustrated in FIG. 3 provides less than 1% DC offset (compared to peak-to-peak analog voltage) and has been tested over a wide temperature range (0° to 50° C.) and over a baseband S/N range of 2 to 30 dB. This circuit has been tested at bit rates from 100 kilobits per second to better than 25 megabits per second.

What is claimed is:

1. A DC offset detector for a DC-coupled digital demodulator generating an information bearing analog signal of controlled peak-to-peak amplitude and a symbol clock comprising:

soft-decision demodulating means responsive to said analog signal and to said symbol clock for providing a repetitive multi-bit output, each such multi-bit output representing polarity and amplitude of said analog signal at different points in time, logic means responsive to said multi-bit output for producing a logic signal of a first type if said multi-bit output represents either an analog signal of one polarity and greater in amplitude than a predetermined amplitude, or an analog signal of other polarity and amplitude less than an equal predetermined amplitude of said other polarity, and means responsive to said logic means for producing a control signal representative of deviations of said logic signal of a first type from 50% duty cycle.

2. A DC offset correction circuit for removing DC offset comprising a DC offset detector of claim 1 and further including:

summing means with two inputs, a first input responsive to said control signal and a second input coupled to said analog signal, and producing an output related to the algebraic sum of said inputs.

3. The apparatus of claim 1 in which said demodulator includes two channels of demodulation and thus, provides an I and a Q channel information bearing analog signal and in which:

said soft-decision demodulator means comprises I and Q soft-decision demodulators, said logic means comprises I and Q logic circuits, each responsive to a corresponding demodulator, and said means responsive to said logic output comprises I and Q means each responsive to an associated logic means and producing I and Q control signals, respectively.

4. A DC offset correction circuit for correcting DC offset comprising the DC offset detector of claim 3 and further including I and Q summing means, each with two inputs, a first input responsive to an associated control signal and a second input coupled to an associated analog signal, and each said summing means producing an output related to the algebraic sum of said inputs.

5. The apparatus of any of claims 1-4 in which said:

soft-decision demodulator means produces a multi-bit output including a sign representing bit and at least one amplitude representing bit, and said logic means including:

means for ANDing all said at least one magnitude representing bit, to produce an AND output, means for EXCLUSIVE ORing the AND output with said sign representing bit negated, for producing said logic output.

6. The apparatus of any of claims 1-4 in which said means responsive to said logic output comprises an active inverting integrating means with a pair of inputs, one from said logic means and another comprising a fixed reference signal, said integrating means further including an output circuit with scale adjusting means for adjusting said control signal.

* * * * *